WATER NAPHTHA

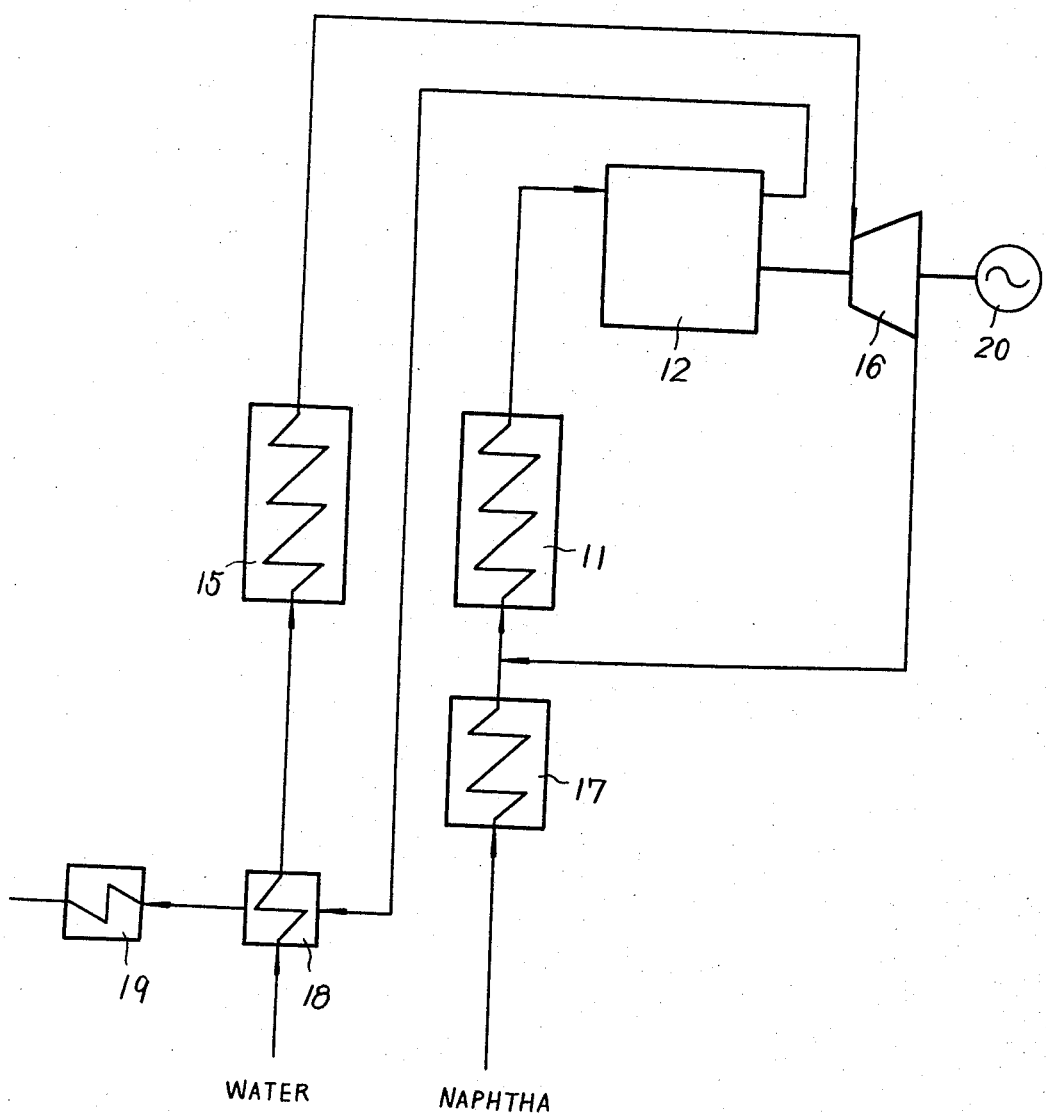

United States Patent Office 3,329,605
Patented July 4, 1967

---

3,329,605
GASEOUS PHASE CRACKING REACTION METHODS
Hiroshi Tokuhisa, Sendai-shi, Eitaro Ishihara, Kobe, and Toshisada Kinoshita, Fujisawa-shi, Japan, assignors to Michikazu Takeyoshi, Miura-gun, Kanagawa-ken, Japan
Filed May 19, 1964, Ser. No. 368,645
Claims priority, application Japan, July 23, 1963, 38/39,326; July 24, 1963, 38/39,474
5 Claims. (Cl. 208—130)

This invention relates to gaseous phase reaction methods for obtaining reaction products by rapidly raising to a reaction temperature by adiabatic compression, gases, vapors or mixtures thereof. The invention further relates to apparatus for effecting the above methods.

Heretofore, in order to carry out gaseous phase reactions at higher temperatures, an exchange of heat or a mixing with high temperature gas, such as combustion gas, has been utilized as a means for raising the temperature of the gas or vapor. Direct cooling, such as watercooling, or exchange of heat has been generally employed as a means for cooling the gas or vapor. However, such steps have numerous disadvantages for carrying out gaseous phase reactions for the reason that the rate of temperature increase and decrease during heating and cooling respectively is relatively slow, and the reaction temperatures and pressures are limited respectively by the quantity and characteristics of the fluid which exchanges heat with the gas undergoing reaction. Several specific disadvantages are listed below.

(1) If the rate of temperature increase or decrease is slow, a long time period is required even at the chemical reaction temperature of the gas or vapor. Therefore, it becomes impossible to employ a higher chemical reaction temperature, resulting in a substantial restriction of the chemical reaction condition to a narrow range.

(2) If the cooling rate is slow, secondary reaction of the reaction products cannot be thoroughly prevented. Therefore, the yield of the products is lowered, and separation and purification of the products is hard to effect.

(3) Since the means for raising the temperature is based on heating from an external source, the maximum temperature is restricted by the materials of the heat exchanger, the reactor vessel, heater and the like.

(4) The capital cost and the floor space for the temperature-raising or the cooling apparatus is very expensive.

(5) A large amount of energy loss cannot be prevented when external heating is employed for raising the temperature of the gas undergoing reaction or when external cooling is employed for lowering the temperature of the reaction gas.

(6) The energy necessary for chemical reaction is extremely small, however, the efficiency is very low due to the employment of fuel for raising the temperature of the reaction gas.

It is an object of the present invention to eliminate the above said disadvantages and to provide a gaseous phase reaction method enabling the reaction temperature of the gas or vapor to be set readily at a higher temperature than heretofore possible.

A further object of the present invention is to provide a gaseous phase reaction method enabling the gas or vapor to be raised very rapidly to a temperature necessary for the chemical reaction thereof.

A still further object of the present invention is to provide a gaseous phase reaction method whereby the reaction temperature of the gas or vapor can be selected in a wide range and the period of time necessary for the gaseous phase reaction can be precisely and readily established.

Yet another object of the present invention is to provide a gaseous phase reaction method whereby high product yield of gas or vapor can be effected.

An additional object of the present invention is to provide a gaseous phase reaction method whereby an extremely small amount of energy loss is realized in a thermal reaction of the gas or vapor.

It is well known that the temperature of gas is raised or lowered by an adiabatic compression or expansion of the gas, but it is novel to apply this to gaseous reactions as in the present invention. Moreover, its application produces many advantages. For example, the temperature-raising or cooling rate due to the adiabatic compression or expansion is 10 to 100 times faster than the heating or cooling rate of reactant gas according to conventional heat exchange methods. It is possible to raise the reaction temperature to an extremely high temperature by employing a raw material of higher specific heat ratio ($C_p/C_v$) or mixing with a gas or vapor of higher specific heat ratio. Also, it is possible in the present method to further raise the reaction temperature range by raising the temperature of the raw material to be supplied by means of preheating. Furthermore, it is possible to recover the considerable energy required for compression of fresh reactant material by passing the reaction gas through an expansion engine which performs adiabatic expansion. The invention is explained in greater detail as follows:

The present invention is applicable to a wide range of reactions. Reactions which are carried out ordinarily under pressure and at higher temperature, such as thermal cracking reactions, catalytic cracking reactions, synthesis reactions and the like, are all applicable. From the viewpoint of the reaction mode, the present invention can be applied not only to non-catalytic reaction, but also to catalytic reactions. From the viewpoint of the reactor, it is possible to use the well-known adiabatic compression apparatus, reactors and adiabatic expansion engines, such as axial or radial hydrodynamic compressors or turbines, as well as displacement type compressors or expansion engines such as reciprocating piston types, Roots types and the like. As for the reciprocating piston type compressor or expansion engine, it is possible to utilize the piston cylinder, crank mechanism and suction and exhausting units of the well-known internal combustion engine (which is hereinafter referred to as a "compression and expansion engine of internal combustion engine type"). In this case, the chemical reaction takes place from the last stage of the compression stroke through the initial stage of the expansion stroke. Further apparatus, such as a raw material pre-heating unit, a product gas cooling unit and the like can be included, if desired, depending upon the conditions of the raw material and the end product, the reaction pressure, the reaction temperature and other similar conditions.

The present invention is applicable to the following processes: naphtha thermal cracking, manufacture of styrene from ethylbenzene, manufacture of benzene by dealkylation of cyclized kerosine, manufacture of ethylene and butadiene by opening the ring of cyclohexane by heating, manufacture of pure benzene and toluene from crude benzene and the like. Moreover, the present invention is obviously not restricted to the above.

The advantages of the present invention are enumerated as follows:

(1) It is possible to set the retention time of the gas or vapor at the reaction temperature almost arbitrarily, due to the now possible rapid heating and cooling, while the yield of the end product is increased.

(2) It is possible to shorten the retention time at the reaction temperature remarkably, and consequently numerous kinds of chemical reactions can be applied.

(3) The secondary reaction of the reaction gas can be thoroughly prevented due to extremely high temperature-raising and cooling rates, and the yield of the end product can be improved.

(4) Floor space for the temperature-raising and cooling equipment is less and the capital cost for the equipment is remarkably reduced as compared with the heating and cooling means employed heretofore in conventional chemical reaction apparatus.

(5) Total energy loss in the apparatus is remarkably reduced.

The aforesaid and other objects of the present invention will become apparent from the following explanation made with reference to the attached drawings.

FIGURE 2 is a schematic diagram wherein the axial compressor and gas turbine in FIG. 1 are replaced by the compression and expansion engine of internal combustion engine type.

Figure 1:
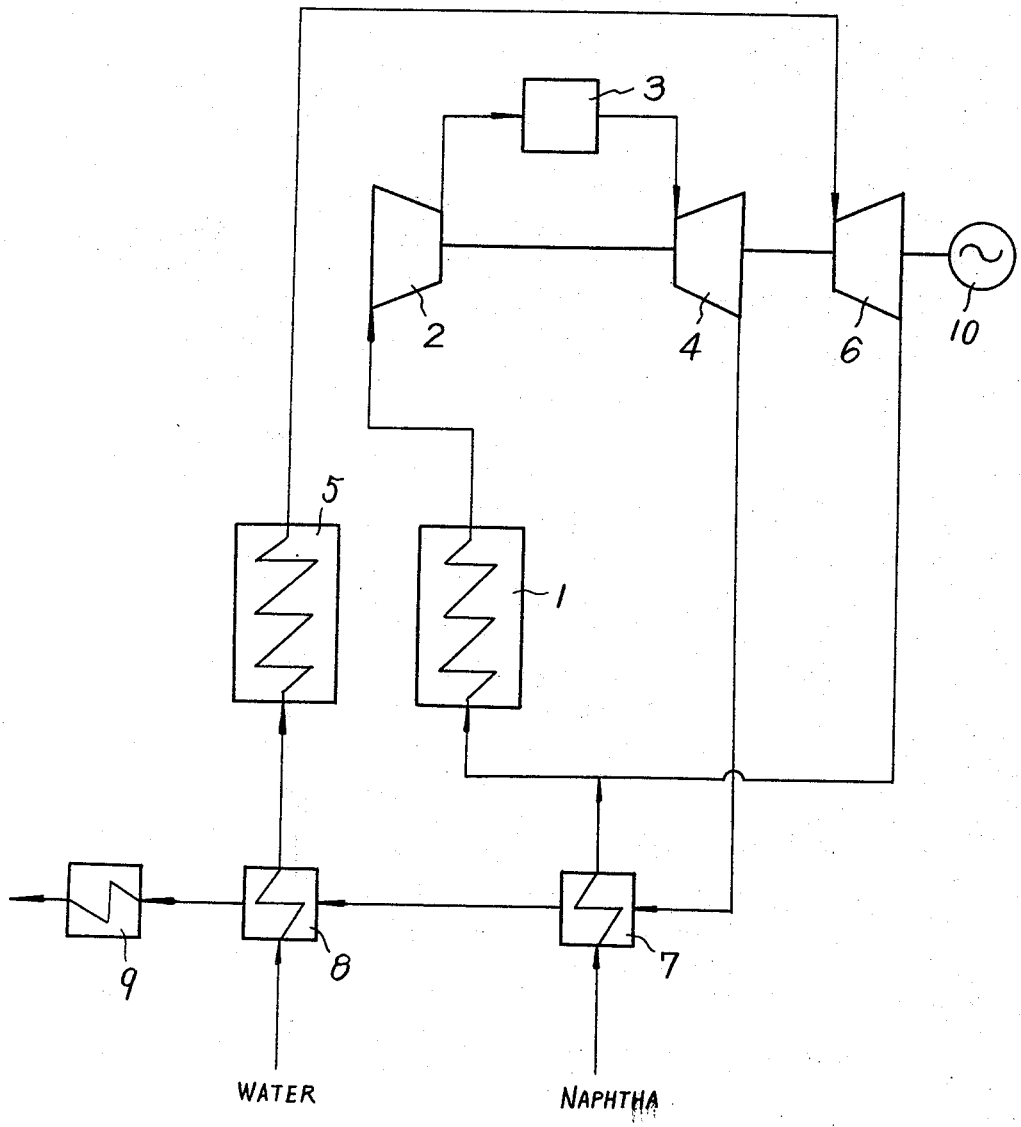
FIGURE 1 is a schematic diagram outlining the equipment for producing cracked gas by carrying out a gaseous phase reaction through adiabatic compression using an axial compressor driven by a gas turbine and a steam turbine.

An embodiment of the present invention is illustrated with reference to thermal cracking of naphtha wherein a well-known axial compressor is used as an adiabatic compression unit and a well-known gas turbine is used as an adiabatic expansion unit.

In FIG. 1, numeral 1 represents a superheater, 2 an axial compressor, 3 a cracking furnace, 4 a gas turbine, 5 a boiler, 6 a steam turbine, 7 a raw material heat exchanger, 8 a feed-water heat exchanger, and 9 a well-known separation and purification unit.

Furthermore, numeral 10 is a motor-generator for making up for the difference between output and input powers of the compressor and the gas turbine and steam turbine.

Naphtha at room temperature and at a pressure of between 1 to 2 atmospheres is first brought into heat-exchanger relation with cracked gas from the turbine 4 in the heat exchanger 7 and raised to a temperature of about 200° C. Thereafter, it is mixed with steam at a temperature of 200° C. and a pressure of between 1 to 2 atmospheres as expended from the steam turbine 6 and heated to a temperature of about 450° C. in the superheater. Then it is subjected to adiabatic compression by the compressor and raised instantly to a pressure of about 46 atmospheres and a temperature of about 800° C. and sent to the cracking furnace 3. Naphtha in the gaseous mixture undergoes thermal cracking in about 1 second, while it is retained in the cracking furnace. Then the gaseous mixture is fed to the gas turbine 4, wherein the pressure and temperature are instantly reduced as the gaseous mixture drives the turbine and gas is discharged from the turbine 4 at a temperature of about 450° C. and at atmospheric pressure. The gas mixture is then sent to the raw material heat exchanger 7 and cooled to a temperature of about 300° C. Then it is sent to the feedwater heat exchanger 8 and further cooled to a temperature of about 200° C. The gas is then transferred to well-known separation and purification means 9, where the purified components of the naphtha are recovered.

Into the feedwater heat exchanger 8 is supplied water at a pressure of about 24 atmospheres at room temperature and the water undergoes heat exchange with the cracked gas which has passed from the turbine 4 through the heat exchanger 7. The feedwater is pre-heated to a temperature of about 150° C. Thereafter it is heated in the boiler 5 and steam at a temperature of about 460° C. is obtained. The steam enters the steam turbine 6 to drive the same and is reduced in pressure to about 1 to 2 atmospheres and is cooled to about 200° C. The discharged steam from the steam turbine 6 is mixed with raw material vapor and then enters the superheater 1. The steam turbine 6, as well as the gas turbine 4 drive the compressor 2.

An example of a naphtha cracking plant having an annual capacity of 143,000 tons (19,800 kg./hr.) operating according to the present invention as described above, is shown in Table 1.

*Table 1*

(1) Naphtha (raw material):
    Heat exchanger—inlet 19,800 kg./hr. pressure 2.5 ata. at 20° C.
    Heat exchanger—outlet 19,800 kg./hr. pressure 2 ata. at 200° C.

(2) Water and steam:
    Feedwater heat exchanger—inlet 17,500 kg./hr. pressure 33 ata. at 20° C.
    Feedwater heat exchanger—outlet 17,500 kg./hr. pressure 32 ata. at 150° C.
    Boiler—outlet 17,500 kg./hr. pressure 30 ata. at 460° C.
    Steam turbine—outlet 17,500 kg./hr. pressure 2 ata. at 200° C.

(3) Gaseous mixture:
    Superheater—inlet 37,300 kg./hr. pressure 2 ata. at 200° C.
    Superheater—outlet 37,300 kg./hr. pressure 1.5 ata. at 450° C.
    Compressor—outlet 37,300 kg./hr. pressure 46 ata. at 800° C.

(4) Cracked gas:
    Gas turbine—inlet 37,300 kg./hr. pressure 46 ata. at 750° C.
    Gas turbine—outlet 37,300 kg./hr. pressure 1.1 ata. at 450° C.
    Raw material heat exchanger—outlet 37,300 kg./hr. pressure 1.06 ata. at 300° C.
    Feedwater heat exchanger—outlet 37,300 kg./hr. pressure 1.03 ata. at 200° C.

(5) Compressor driving input power __kw__   11,500
(6) Gas turbine output power _____kw__    9,000
(7) Steam turbine output power _____kw__    2,500
(8) Boiler and superheater fuel __kcal./hr__ 22,100,000

(9) Product yield, tons/year:
    Ethylene _____ 26,200
    Propylene _____ 15,300
    Methane _____ 16,300
    Ethane _____  6,900
    Butylene _____  5,800
    Others _____  6,100

Gas total _____ 76,600

Paraffins, naphthenes _____ 32,400
    Olefins _____  3,800
    Aromatics _____ 30,200

Liquid total _____ 66,400

Gas and liquid grand total _____ 143,000

In this example, the gas turbine is short of output power by 2,500 kw. as compared with the required input power which is supplemented by the steam turbine. However, it is possible to operate by balancing the output power with the input power or making the output power exceed the input power, depending upon a selection of pressure and temperature of raw material at the compressor inlet and a selection of pressures and temperatures of cracked product and vapor at the gas turbine outlet.

FIG. 2 shows an embodiment of this invention wherein a compression and expansion engine of internal combustion type is employed allowing the reaction pressure to be the relatively high value required in the said naphtha cracking plant. Numeral 12 refers to a compression and expansion engine of internal combustion type wherein the compression action or expansion may be carried out in a single cylinder or in different cylinders respectively. It is desirable in the compression and expansion engine of internal combustion type to keep the suction temperature of the gas mixture of naphtha and steam below 300 to 350° C., and therefore, the raw material naphtha is subjected to heating and vaporization in the raw material evaporator 17 and is then mixed with the exhaust steam from the steam turbine 16, whereafter the mixture enters the superheater 11. The naphtha is superheated to a temperature of about 300° C. and is supplied to the compression and expansion engine of internal combustion type 12 which is driven by the turbine 16. The naphtha is subjected to adiabatic compression instantly in the engine 12 and is raised to a pressure of 38 ata. and a temperature of 770° C. Then the naphtha undergoes thermal cracking and is subjected to adiabatic expansion, resulting in rapid reduction in pressure substantially to atmospheric pressure and in temperature to 280° C. At the same time the high temperature cracked gas is very rapidly cooled and therefore the cracked gas is prevented from undergoing polymerization reaction. The cracked gas delivered from the compression and expansion engine 12 is sent to well-known separation and purification unit 19 via the feedwater heat exchanger 18.

The feedwater passes from heat exchanger 18 to boiler 15 and then to turbine 16. Motor-generator 20 is in driving relation with turbine 16 to be driven thereby when the energy thereof exceeds the required amount necessary to drive engine 12. When the energy developed by turbine 16 is not sufficient to drive engine 12, then turbine 16 is driven by motor 20.

The operating conditions of the embodiment shown in FIG. 2 are shown as follows in Table 2.

Table 2

(1) Naphtha (raw material):
 Raw material evaporator—inlet 19,800 kg./hr. pressure 2.5 ata. at 20° C.
 Raw material evaporator—outlet 19,800 kg./hr. pressure 2 ata. at 200° C.

(2) Water and steam:
 Feedwater heat exchanger—inlet 22,200 kg./hr. pressure 33 ata. at 20° C.
 Feedwater heat exchanger—outlet 22,200 kg./hr. pressure 32 ata. at 150° C.
 Boiler—outlet 22,200 kg./hr. pressure 30 ata. at 460° C.
 Steam turbine—outlet 22,200 kg./hr. pressure 2 ata. at 200° C.

(3) Gas mixture:
 Superheater—inlet 43,000 kg./hr. pressure 2 ata. at 200° C.
 Superheater—outlet 43,000 kg./hr. pressure 1.5 ata. at 300° C.

(4) Cracked gas:
 At completion of compression—pressure 38 ata. at 770° C.
 Compression and expansion engine—outlet 42,000 kg./hr. pressure 1.1 ata. at 280° C.
 Feedwater heat exchanger—outlet 42,000 kg./hr. pressure 1.03 ata. at 180° C.

(5) Input power for driving compression and expansion engine—about 1000 kw.

(6) Output of steam turbine—about 3,200 kw.

(7) Fuel for boiler, superheater and evaporator—about 28,000,000 kcal./hr.

(8) Yield—same as in Table 1, item 9.

In the present invention, even if the raw material vapor is mixed and compressed with gases having higher specific heat ratio ($\gamma$) such as steam, nitrogen, argon and the like to make it reach a temperature necessary for chemical reaction by adiabatic compression, the pressure becomes remarkably higher at the compression.

It is conventional knowledge that the desired thermal cracking reaction is prevented if the pressure increases, but it has been confirmed by the present invention that the desired thermal cracking reaction can be thoroughly carried out even at high pressure if the temperature is thoroughly elevated.

Thus, the reaction products obtained by the thermal cracking of a mixture (1 atmosphere, 300° C.) of normal heptane, methyl cyclohexane and nitrogen by subjecting the same to adiabatic compression and expansion carried out instantly in the compression and expansion cycles of an internal combustion engine are shown in Table 3, wherein the ethylene yield is noted to be especially high.

Table 3
RESULT OF EXPERIMENT

| | Gas composition, mol percent | | |
|---|---|---|---|
| Compression ratio: $\epsilon$ | 15 | 30 | 40 |
| Product: | | | |
| Methane $CH_4$ | 17.5 | 30.3 | 30.9 |
| Ethylene $C_2H_4$ | 19.6 | 34.0 | 34.8 |
| Ethane $C_2H_6$ | 1.6 | 2.8 | 2.8 |
| Propylene $C_3H_6$ | 12.1 | 5.4 | 7.7 |
| Propane $C_3H_8$ | 22.7 | 11.7 | 7.7 |
| Butylene $C_4H_8$ | 18.2 | 0.6 | 0.7 |
| Hydrogen $H_2$ | 8.2 | 15.2 | 15.4 |
| Total | 99.9 | 100.0 | 100.0 |

Numerous modifications and variations of the disclosed embodiments will become apparent to those skilled in the art without departing from the scope and spirit of the invention as defined by the following claims.

What is claimed is:

1. A method of cracking naphtha comprising heating feedwater in a boiler to generate steam, driving a steam turbine with the steam, mixing the steam expended from the turbine with naphtha to be cracked, superheating the mixture of naphtha and steam, adiabatically compressing the superheated mixture to a temperature and pressure level sufficient to cause thermal cracking of the naphtha without burning thereof, adiabatically expanding the thus cracked naphtha to cool the same rapidly and lower the pressure to prevent polymerization of the cracked naphtha constituents, and thereafter recovering the cracked naphtha constituents, the adiabatic compression being effected at least in part by the output energy of the steam turbine.

2. A method as claimed in claim 1 wherein the cracked naphtha releases energy during adiabatic expansion, the method further comprising utilizing the energy released by the cracked naphtha during expansion to adiabatically compress fresh naphtha for cracking the same.

3. A method as claimed in claim 1, wherein the adiabatic expansion is effected in a gas turbine and the adiabatic compression is effected in a compressor, the method further comprising transferring heat from the mixture discharged from the gas turbine to fresh naphtha to preheat the same.

4. A method as claimed in claim 3 comprising transferring heat from the mixture discharged from the gas turbine to incoming feedwater being supplied to the boiler.

5. A method as claim in claim 1 wherein the adiabatic compression of the naphtha is effected during the compression stroke in an internal combustion engine and the adiabatic expansion is effected during the next expansion stroke of the engine whereby compression and expansion is effected rapidly.

(References on following page)

References Cited

UNITED STATES PATENTS

| | | | |
|---|---|---|---|
| 1,619,896 | 3/1927 | Trent | 208—92 |
| 1,687,595 | 10/1928 | Shore | 208—107 |
| 2,727,932 | 12/1955 | Evans et al. | 260—683 |
| 2,727,933 | 12/1955 | Evans et al. | 260—683 |
| 2,904,502 | 9/1959 | Shapleigh | 208—130 |
| 2,937,140 | 5/1960 | Stinson | 208—340 |
| 2,970,107 | 1/1961 | Gilmore | 208—365 |

FOREIGN PATENTS 1,102,112  3/1961  Germany.

DELBERT E. GANTZ, *Primary Examiner.*

HERBERT LEVINE, *Examiner.*